United States Patent
Tabak

(10) Patent No.: US 7,497,998 B2
(45) Date of Patent: Mar. 3, 2009

(54) GAS CONVERTER

(75) Inventor: Enrique Tabak, Toronto (CA)

(73) Assignee: SNC-Lavalin Inc., Toronto (CA)

( * ) Notice: Subject to any disclaimer, the term of this patent is extended or adjusted under 35 U.S.C. 154(b) by 240 days.

(21) Appl. No.: 11/515,776

(22) Filed: Sep. 6, 2006

(65) Prior Publication Data

US 2008/0056968 A1 Mar. 6, 2008

(51) Int. Cl.
*B01D 50/00* (2006.01)
*F01N 3/10* (2006.01)
*B01J 10/00* (2006.01)
*B01J 8/02* (2006.01)
*C01B 17/74* (2006.01)

(52) U.S. Cl. .................. 422/171; 422/173; 422/176; 422/180; 422/181; 422/191; 422/192; 422/193; 422/211; 423/532; 423/533

(58) Field of Classification Search .............. 422/171, 422/173, 176, 180, 181, 191, 192, 193, 211; 423/532, 533
See application file for complete search history.

(56) References Cited

U.S. PATENT DOCUMENTS

| 4,335,076 A | 6/1982 | McFarland |
| 5,232,670 A | 8/1993 | Cameron |
| 5,302,353 A * | 4/1994 | Cameron .................... 422/171 |
| 5,480,620 A | 1/1996 | Cameron |

* cited by examiner

*Primary Examiner*—Walter D Griffin
*Assistant Examiner*—Lessanework Seifu
(74) *Attorney, Agent, or Firm*—Ogilvy Renault LLP; Paul J. Field

(57) ABSTRACT

A converter having an exterior shell with a central axis, at least one gas inlet and at least one gas outlet. The exterior shell includes a base and an interior support structure. A number of vertically stacked catalytic chambers within the exterior shell are each in communication with one or more gas inlets and gas outlets. Each chamber is defined by an inner wall of the external shell, a permeable catalytic bed support platform, a lower division plate spaced below the platform defining a gas retention plenum and an upper division plate above the platform. At least one of: the platform; the upper division plate; and the lower division plate have a toroid surface symmetric about the central axis with an outer periphery supported by the inner wall of the exterior shell and an inner periphery supported by the interior support structure.

15 Claims, 5 Drawing Sheets

GAS CONVERTER

TECHNICAL FIELD

The invention relates to a gas converter for housing multiple beds of catalyst each on a tension stressed toroidal support platform with high temperature gas contained under pressure by a tension stressed toroidal division plate.

BACKGROUND OF THE ART

Industrial catalytic converters are used for example to convert sulphur dioxide gas to sulphur trioxide gas in the manufacture of sulphuric acid. Large pressure vessels of stainless steel have multiple layers of granular catalyst housed within the converters and gas is passed through the permeable granular catalyst beds under pressure and at elevated temperatures. Due to the highly corrosive nature of the gases, all ducting and support structures within the converter are constructed of stainless steel. Such structures are expensive to build due to the relatively high cost of materials, the complexity of welding stainless steel to maintain corrosion resistance, and the requirement of highly skilled labour often working in remote locations.

Examples of prior art converters are shown in U.S. Pat. No. 4,335,076 to McFarland and U.S. Pat. No. 5,232,670 to Cameron. Earlier converters included vertically stacked flat support platforms within a cylindrical converter vessel, having a grillage supported on columns. Since all internal components had to be corrosion resistant, construction of such grillage platforms was very expensive and led to curved plate supports as described in the above mentioned patents. From such examples it will be appreciated that converters are highly variable in configuration with external and internal gas ducts, plenums and catalyst support platforms and heat exchangers combined to form a complex, large scale and expensive structure.

When high cost materials and highly skilled workers are necessary, adoption of an efficient practical converter design can multiply the savings of the owner not only in the capital cost of construction, the reduced land area occupied but also in the reduction of air flow drag losses through ducts and reduction in routine maintenance. Especially in remote locations, simple savings in the weight of components can significantly reduce shipping costs, and simplification of the design can reduce the total cost of skilled labour on site and in prefabrication. In manufacturing and erection the repetition of standard or identical components aids in simplifying procedures and reduces costs through economies of scale. Symmetry in the design of repetitive components results in simplified components that are less costly to manufacture and erect. In most instances symmetry of design reduces local stress concentrations that usually arise due to geometric inconsistencies, and therefore can lead to a reduction in the amount of material used since stresses are reduced in local areas of a structure.

The opposite is also true that failure to fully consider the lifecycle costs of designing, manufacturing, construction and operation of a complex converter design can increase overall costs significantly.

Features that distinguish the present invention from the background art will be apparent from review of the disclosure, drawings and description of the invention presented below.

DISCLOSURE OF THE INVENTION

The invention provides a converter having an exterior shell with a central axis, at least one gas inlet and at least one gas outlet. The exterior shell includes a base and an interior support structure. A number of vertically stacked catalytic chambers within the exterior shell are each in communication with one or more gas inlets and gas outlets. Each chamber is defined by an inner wall of the exterior shell, a permeable catalytic bed support platform, a lower division plate spaced below the platform defining a gas retention plenum and an upper division plate above the platform. At least one of: the platform; the upper division plate; and the lower division plate have a toroid surface symmetric about the central axis with an outer periphery supported by the inner wall of the exterior shell and an inner periphery supported by the interior support structure.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

Figure 7:
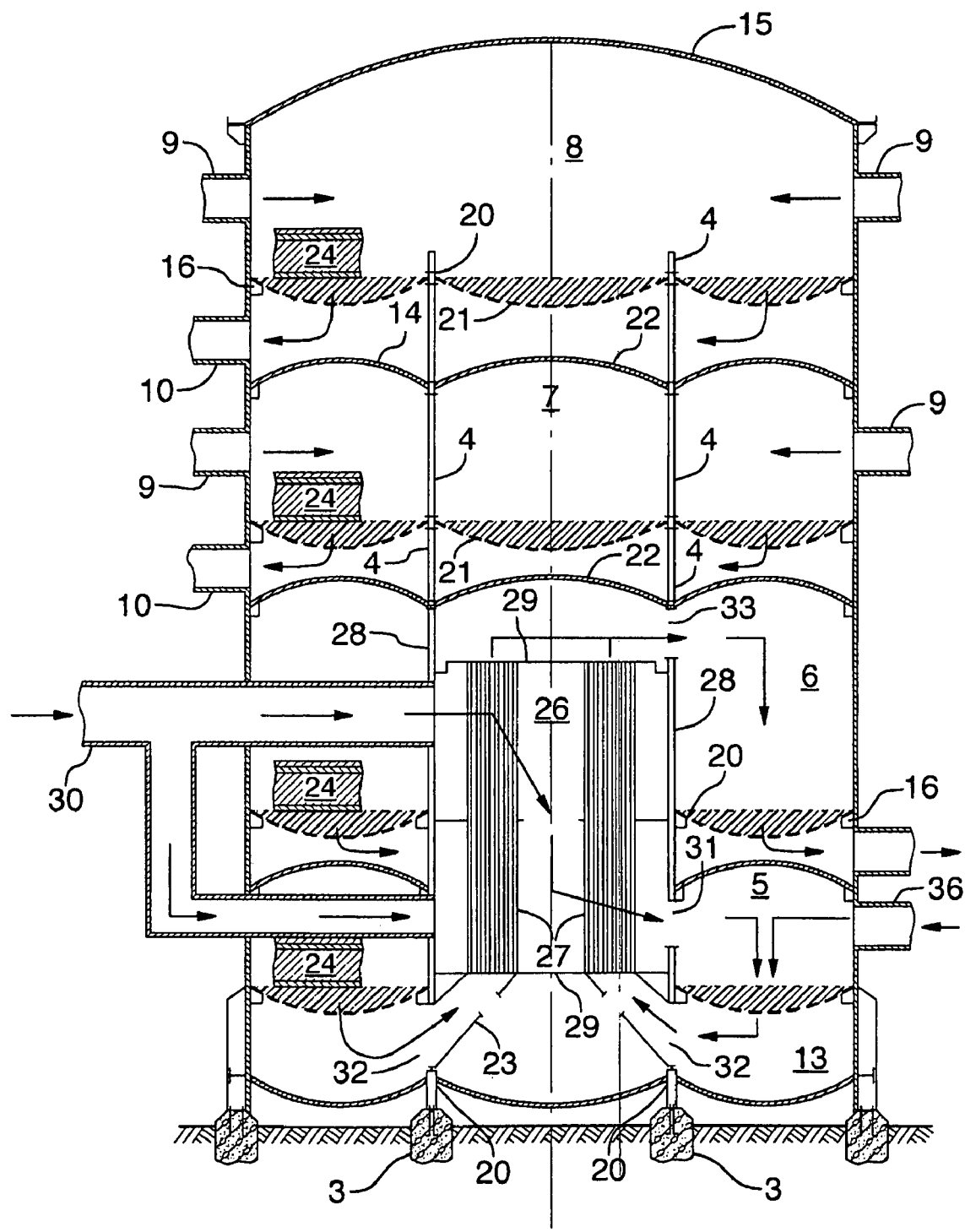
FIG. 7 is a sectional elevation view in accord with a second embodiment of the invention, where the second embodiment includes a primary heat exchanger conveying gas in communication with a first pass catalytic chamber and a second pass catalytic chamber.
Figure 8:
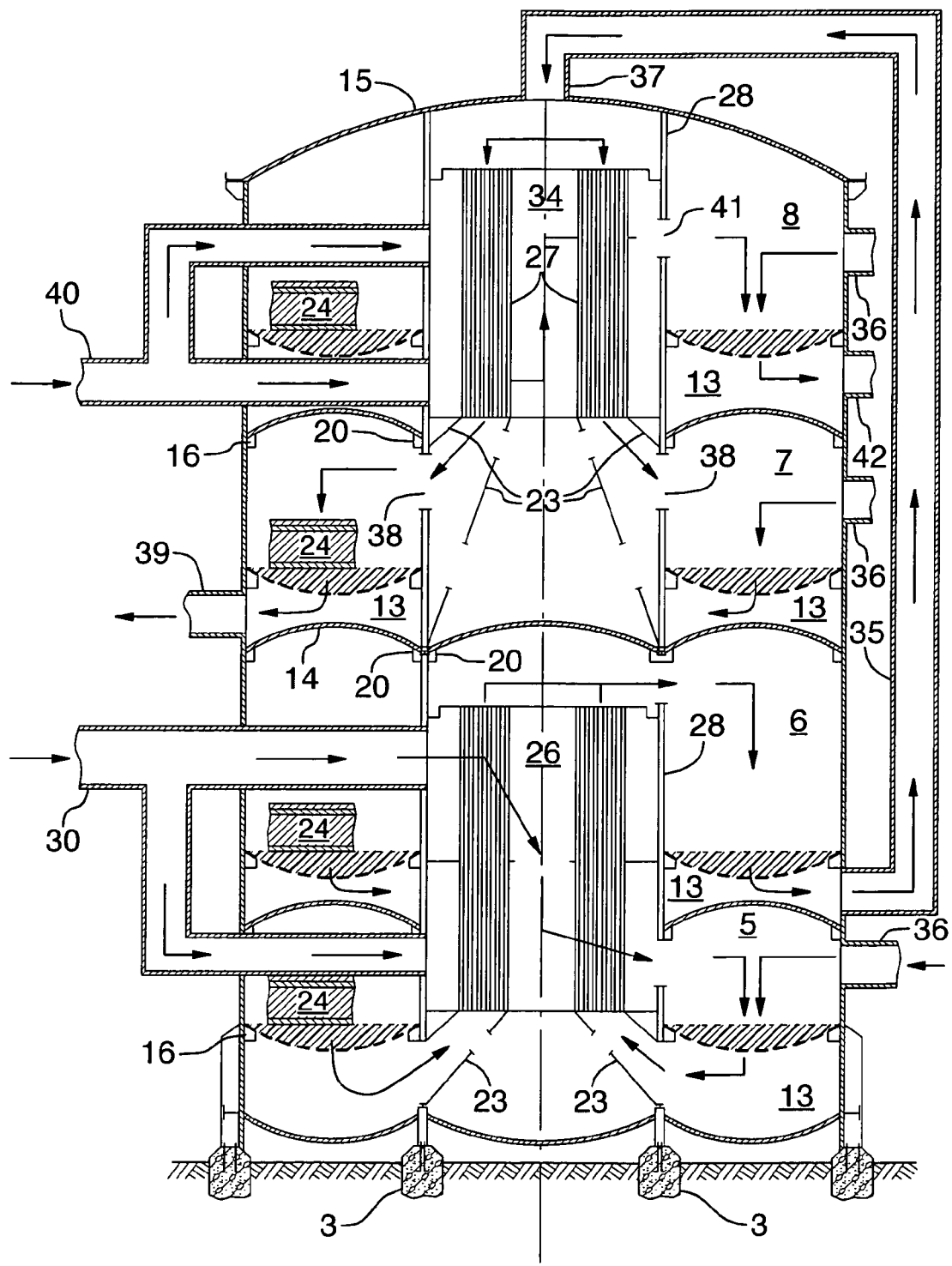
FIG. 8 is a sectional elevation view in accord with a third embodiment of the invention, where the third embodiment includes, in addition to the primary heat exchanger of FIG. 7, a secondary heat exchanger conveying gas from the second pass catalytic chamber to the third pass catalytic chamber and in communication with externally supplied gas and a fourth pass catalytic chamber.

FIGS. 1-6 show the components of a four level converter according to the first embodiment having no heat exchanger but rather using a dish to span the central area of the converter and use the area as a catalytic bed. FIG. 7 shows a converter according to the second embodiment having a primary heat exchanger in communication with the first and second pass chambers while the upper third and fourth chambers remain similar to those of the first embodiment. FIG. 8 shows a converter according to the third embodiment having a primary heat exchanger similar to the second embodiment of FIG. 7 with the addition of a secondary heat exchanger in communication with the third and fourth pass chambers. It will be understood that in all embodiments various components are common and other variations are possible, for example while the dish and toroidal plates are co-axial, it is possible to add a further outer coaxial toroid to increase the area used. Further the converter is shown as a cylinder whereas other variations within the scope of the invention will be recognized by those skilled in the art.

Figure 1:
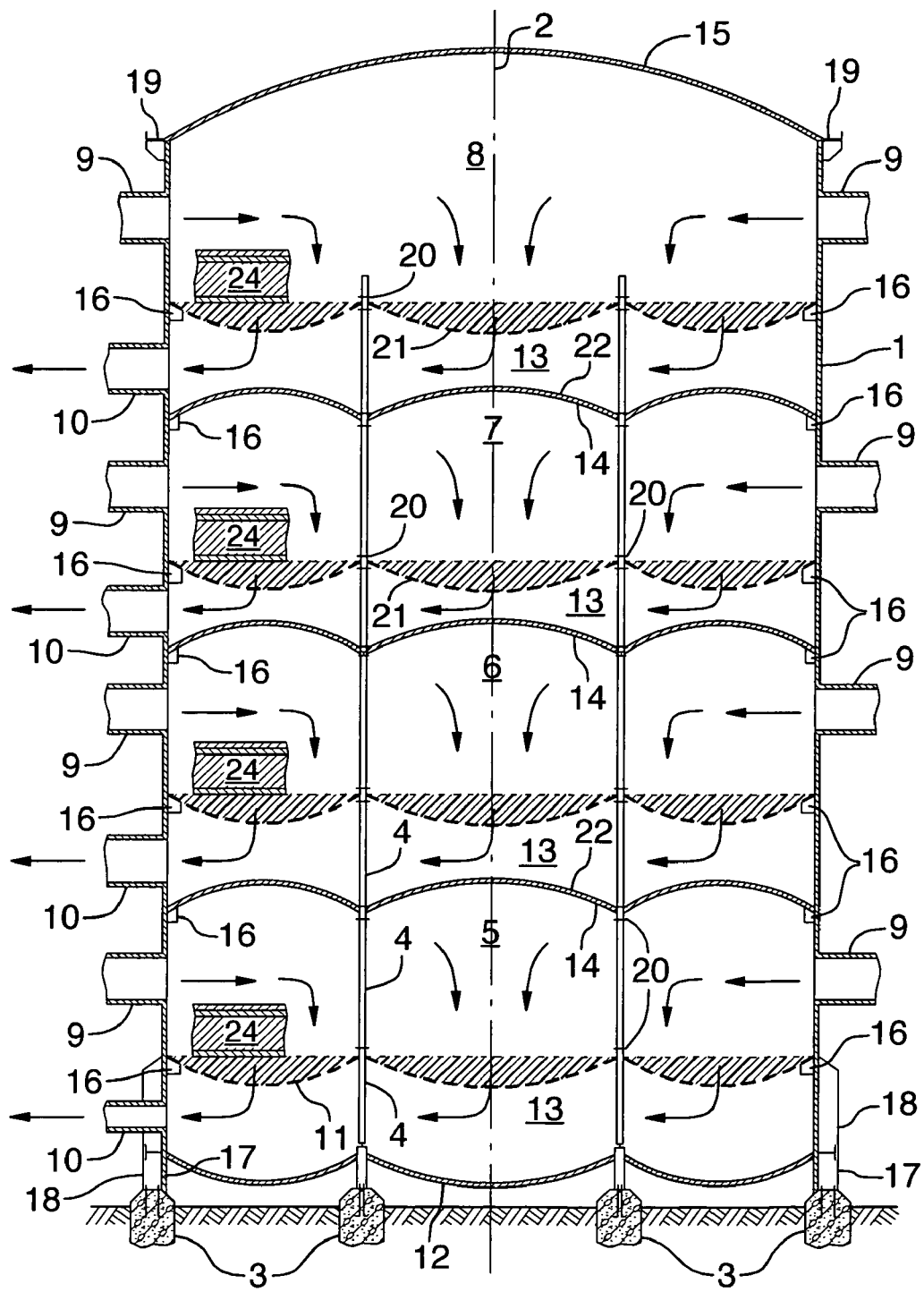
FIG. 1 is a sectional elevation view along a plane through the central axis of a cylindrical converter, in accord with a first embodiment of the invention, showing four vertically stacked catalytic chambers each with two lateral gas inlets above the catalyst bed and a single gas outlet from the gas plenum beneath the bed.

FIG. 1 shows a first embodiment of a converter with an exterior cylindrical shell 1 having a central axis 2, a support base of concrete foundation piers 3 which support the exterior shell 1 and an interior support structure including a circle of interior columns 4 between the levels of in the converter. In the first embodiment shown each of the four vertically stacked catalytic chambers 5-8 within the exterior shell 1 have two gas inlets 9 and a single gas outlet 10. The chambers 5-8 do not communicate with each other within the converter in the illustrated embodiment, however various other ducting arrangements between the chambers 5-8 can be accommodated depending on the requirements of the process.

Figure 2:
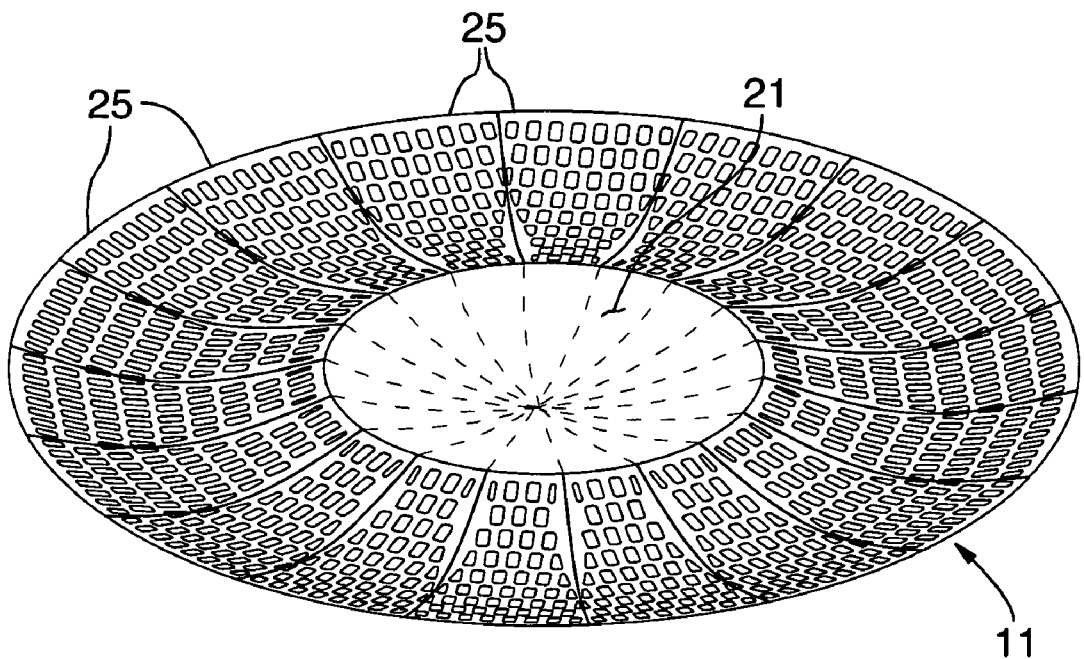
FIG. 2 is a perspective view of a permeable catalytic bed support platform made of identical segmented plates to form a toroid.
Figure 3:
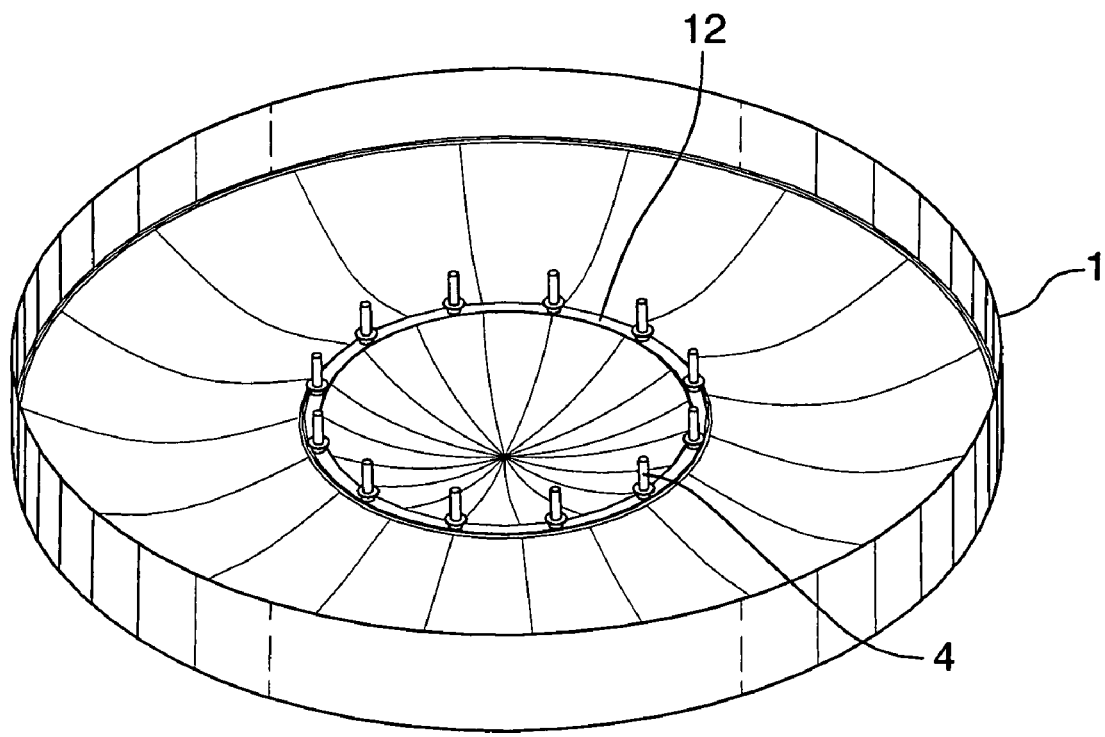
FIG. 3 is a perspective view of the bottom level gas plenum from FIG. 1 showing inner wall of the exterior shell, toroid plate, central spherical dome or dish with a ring of columns, where it will be understood that the division plates above the catalyst beds have a similar geometry.

The first pass catalytic chamber 5, for example referring to FIGS. 1-3, is defined by the inner wall of the exterior cylindrical shell 1, a permeable catalytic bed platform 11, a bottom division plate 12 spaced below the platform 11 to define a gas retention plenum 13, and a gas retaining intermediate division plate 14 above the platform 11.

It will be understood that although FIG. 3 shows a bottom division plate 12 which is concave up, that the geometry of the division plates 14 is identical but inverted to be concave down. The top division plate 15 is a dome shape to shed rain and snow. Where chambers are vertically stacked (6 on 5, 7 on 6 and 8 on 7), the upper surface of the intermediate division plate 14 of the lower chamber, serves as the bottom wall of the gas plenum 13 of the upper chamber to divide between stacked chambers.

As best seen in FIGS. 2-3, the platforms 11 and the division plates 14 (identical in geometry to the bottom division plate 12 in FIG. 3) have a toroid surface symmetric about the central axis 2 of the converter. The outer periphery of the toroid surface of each platform 11 and intermediate division plate 14 is supported on external ring beams 16 mounted to the exterior shell 1. FIG. 2 shows the toroid surface of a platform 11 but the geometry is identical for the toroid surface of the division plate 12 in FIG. 3 and the division plates 14. To enable large size structures to be fabricated of sheet metal and to be shipped to a job site, the toroid surfaces are divided into identical segments 25 with each segment 25 having abutting radial edges with adjacent like segments. The radial butt joints can be welded on site with automatic welding equipment. The segments 25 can have identical geometry to simplify the manufacture and assembly of platforms 11, gas retention division plates 12 and gas retention division plates 14. The plate thickness of segments 25 can vary to suit the loading applied and stresses generated. The camber of the curved plates can be varied depending on design conditions. Openings in the segments 25 as shown in FIG. 2 can also be cut to permit gas passage while maintaining the constant geometry and symmetry of the design.

As best seen in FIGS. 1, 4-6, the external ring beams 16 may be welded plate box beams welded to the exterior shell 1 at the required elevation to reinforce the shell 1, transfer vertical loads and resist lateral hoop stresses. The ring beams 16 can take the shape of many known shell reinforcing structures, for example: a frusto-conical plate or bar; an annular plate; a beam having one flange and two web sections; a channel section; an angle section; or a T-shaped section circling the inner or outer surfaces of a shell. It will be understood that insulating layers may be installed on the exterior surface of the exterior shell 1 to maintain internal temperatures and to resist heat loss due to the external weather conditions.

Figure 5:
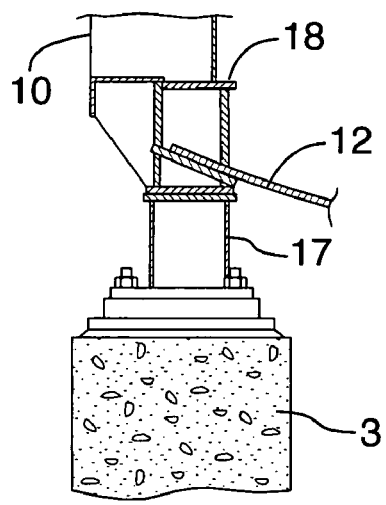
FIG. 5 is a detailed sectional view of the left portion of FIG. 1 showing the exterior shell of the converter, with base column on a concrete foundation supporting a ring beam, an outlet opening reinforcing, a ring beam supporting a toroidal platform plate, a ring beam supporting a toroidal division plate, and an external eaves ring beam supporting the roof or top division plate.
Figure 6:
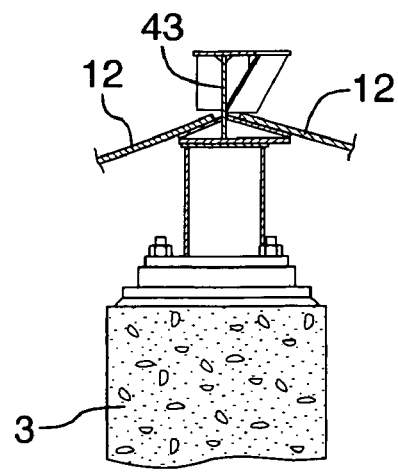
FIG. 6 is a detailed sectional view of an interior foundation with base column of the interior support structure.

The ring or box beams 16 about the perimeter of structural components gives significant rigidity to the shells and prevent buckling inwardly or outwardly. FIG. 5 shows an exterior base column 17 supporting the exterior shell 1 on the concrete pier 3 with plate reinforcing 18 around gas outlet 10 which may be provided where loads are relatively high whereas toward the top of the converter where loads are lower, the external ring beam 16 supporting the intermediate division plate 14 has no reinforcing support and the eaves ring beam 19 supports the top division plate 15 in a like manner.

Figure 4:
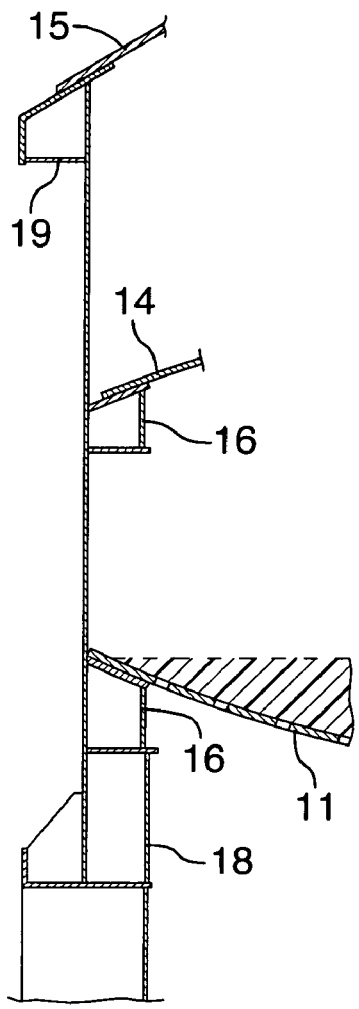
FIG. 4 is a perspective diagram showing the location of the interior support structure of the embodiment in FIG. 1 with vertical columns and ring beams to connect to the outer periphery of the central dish and dome components, and to connect to the inner periphery of the toroid plates of the platforms and division plates.
Figure 4:
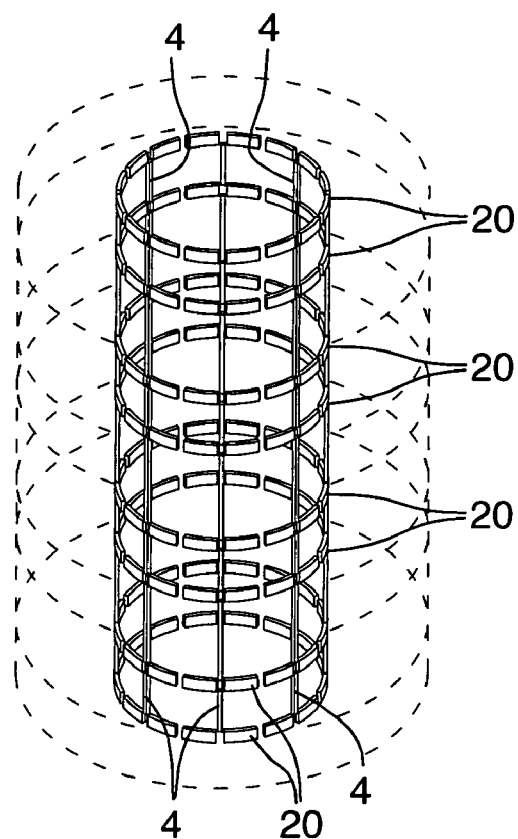

In the central area of the converter, FIG. 4 shows in schematic view a central interior support structure comprising a ring of columns 4 at each level, and an interior ring beam 20. In the embodiment shown in FIG. 6 the interior ring beam 43 is shown as an I-beam section formed in a circle however in FIGS. 7-8 the interior ring beams 20 are also shown as welded box beams like the external ring beams 16. The interior ring beams 20 support the inner periphery of the toroid surfaces of the platforms 11 and intermediate division plates 14.

Further in the first embodiment shown in FIGS. 1-6, the chambers 5-8 are open across the diameter of the converter and gas may flow through gas flow passages between the columns 4 across the entire catalyst bed. The platforms 11 have a central dish 21 supported about an outer periphery by the internal ring beams 20 while the division plates 14 have a central dome 22 likewise supported about an outer periphery by the internal ring beams 20. The open gallery created in the chamber permits free flow of gases and simple direct gas flow thorough the catalyst bed. The second and third embodiments of FIGS. 7-8 show heat exchangers supported with cones 23 upon the internal ring beams 20 as well.

Referring to FIG. 1-3, it will be apparent that in order to convey gas through the catalytic beds 24 of granular permeable material, some reduction in gas pressure will occur due to friction losses, turbulence or drag. Accordingly, the gas pressure in the chamber 5-8 above the bed 24 is relatively higher than the gas pressure below the bed 24 in the plenum 13. Gas is then evacuated from the plenum 13 for further processing. The top division plate 15, intermediate division plates 14, and bottom division plate 12 all serve in operation to resist a pressure differential (also known as "ΔP") between a relatively higher operational pressure and a lower operational pressure. For example, the roof or top division plate 15 is exposed to atmospheric pressure on the top side as well as external dead and live loading such as self-weight, snow loads, rain and wind loads. The roof or top division plate 15 is also exposed to the live load pressure within the fourth pass chamber 8 on the bottom side which is higher than atmospheric pressure. Likewise the bottom division plate 12 of the first pass chamber 5 is exposed to external atmospheric pressure and internal pressure in the plenum 13. The plenums 13 of the intermediate areas of the converter operate at a lower pressure to evacuate gas than the chambers below (7,6,5) above the beds 24 which operate at a higher pressure to force gas through the bed and compensate for loss of pressure as a result. The division plates 15, 14, and gas division plate 12 of each chamber 5-8 are concave toward the higher operational pressure and convex toward the lower operational pressure. This feature of the design ensures that the thin metal plates of which these components are fabricated resist the pressure differential loads in tension and not in compression or in thereby bending optimizing the utilization of the material. Designing thin metal plates to resist stresses in tension avoids buckling of the thin plates.

Further in the first embodiment shown in FIGS. 1-6, the chambers 5-8 are open across the diameter of the converter and gas may flow through gas flow passages between the columns 4 across the entire catalyst bed. The platforms 11 have a central dish 21 supported about an outer periphery by the internal ring beams 20 while the division plates 14 have a central dome 22 likewise supported about an outer periphery by the internal ring beams 20. The open gallery created in the chamber permits free flow of gases and simple direct gas flow through the catalyst bed. The second and third embodiments of FIGS. 7-8 show heat exchangers supported with cones 23 upon the internal ring beams 20 as well.

The various zones of the converter can be considered to be pressure vessels or ducts containing gas at a positive or negative pressure in operation. The utilization of thin materials for the walls of pressure vessels is made practical through use of curved surfaces such as cylinders, spheres or domes. When the relatively higher pressure is on the concave side of the wall, since the thin wall then tends to remain in tension, thin curved walls do not require reinforcement to remain stable. Thin walls in compression are liable to buckle requiring reinforcing ribs and therefore thin walls in tension are in general a more stable compared to thin walls in compression. Such structural design considerations are implicit to those skilled in the art but bear emphasis in the present description, since in the complex structure illustrated in FIG. 1, it is not immediately apparent that sections of the converter with outwardly bulging walls are under relatively high operational pressure whereas those sections with inwardly bulging walls are under relatively lower pressure or even negative pressure. Accordingly, use of toroid shapes, dome or dish shapes repeating in size through the converter design leads to an efficient use of material as well as a simplified manufacturing and construction procedure.

Referring to FIGS. 7 and 8, the second and third embodiments illustrated include heat exchangers housed within the central area of the converter. The annular space around the heat exchangers remains as an annular catalytic chamber as described above. The positioning of a heat exchanger within the converter, as opposed to locating externally, leads to several advantages. The close proximity of the heat exchanger to the catalytic beds 24 significantly reduces the gas ducts and associated insulation required thereby reducing capital costs, maintenance costs and pressure loss. Significantly less land area or footprint is required and gas flow is less turbulent. Gas flow paths are simple and direct, less distance is traveled due to the compact nesting of chambers and heat exchangers, thereby reducing pressure losses and reducing flow restrictions. In the operation of the converter, reduction in gas flow pressure losses has a long term effect in reducing blower power requirements and maintenance costs. Further the heat exchangers can perform independent functions and are ducted directly with reduced flow resistance due to their location. The design of the heat exchangers need not have modified diameter, height, or design of tube sheets and other components to suit the installation inside the converter as opposed to an independent installation apart from the converter. Avoiding any modification, especially to the vertical tubes and tube sheets through which tubes extend, thereby saves costs by avoiding redesign or alteration in the manufacturing and test certification of the heat exchangers.

FIG. 7 shows a second embodiment including a "hot" or primary heat exchanger 26 in flow communication with the first pass catalytic chamber 5 and the second pass catalytic chamber 6. The top half of the converter is identical to the first embodiment of FIG. 1 with third pass catalytic chamber 7 and fourth pass catalytic chamber 8, being open to gas flow across the entire cross-section of the converter having a ring of columns 4 and interior ring beams 20 forming the top portion of the interior support structure. However, the primary heat exchanger 26 requires an outer containment duct to contain gas flow over the internal tubes 27. In the embodiment illustrated therefore, the interior support structure comprises a cylindrical interior shell 28 of sheet metal which serves to contain gases as well as to support the structure.

The interior shell 28 is supported on the inside concrete piers 3, with a cone 23 providing support for the heat exchanger 26 upon an interior ring beam 20. The cones 23 have openings in their sides to permit through flow of gas and form part of the gas paths. The interior shell 28 may have reinforced gas flow openings (32, 33 for example) in communication with a plenum 13, a chamber 5 above the catalytic bed 24, a heat exchanger inlet 32, or heat exchanger outlet 31. Gas flow openings may be distributed circumferentially as required in a horizontal plane in communication with various catalytic chambers to form an internal gas duct system. The interior shell 28 may support one or more box shaped interior ring beams 20 in a manner similar to the exterior shell 1, however the interior ring beams 20 may be positioned on the inside surface or outside surface of the interior shell 28 depending on the requirements of the structural design.

The second embodiment illustrated in FIG. 7 shows a conventional tube heat exchanger where a first flow path passes over the exterior surface of the vertical tubes 27 contained by top and bottom tube sheets 29 from a first inlet 30 to a first outlet 31. A second flow path through the interior of the tubes 27 is conveyed upwardly as drawn and communicates thermally through the tube walls with the gas flow in the first path. The second flow path through the primary heat exchanger 26 conveys gas from a second inlet 32 to a second outlet 33 such that the first outlet 31 outputs gas above the catalytic bed 24 of chamber 5 and after gas passes through the bed to the plenum 13 the second inlet 32 intakes gas from first pass chamber 5 and conveys the gas to second pass chamber 6 via the tubes 27 and outlet 33. Dilution inlet 36 is shown as an option to illustration the potential for ducting as required for various chemical or thermodynamic process steps. As a result, the combination of the beds 24 and primary heat exchanger 26 provide a compact system with minimal ductwork and reduced footprint.

FIG. 8 illustrates a third embodiment where the cylindrical interior shell 28 extends the full height of the converter from the foundation piers 3 to the top division plate 15. An "interpass" or secondary heat exchanger 34 is provided with vertical tubes 27 conveying gas from an external duct 35 which communicates through the secondary heat exchanger 34 between the plenum 13 of the second pass catalytic chamber 6 and the third pass catalytic chamber 7 above the bed 24. The secondary heat exchanger 34 has a somewhat different set of flow paths and illustrates the variation possible while maintaining the compact design of the converter. A third flow path commences at a third inlet 37 passing through the interior of the tubes 27 to exit via an annular array of third outlets 38. The third outlets 38 output gas above the catalytic bed 24 of the third pass chamber 7. Gas then is collected in the plenum 13 and exits the converter via one or more outlets 39 for external processing if required. The fourth flow path commences at the fourth inlet 40 passing over the exterior of the tubes 27 to exit via a fourth outlet 41 above the catalytic bed 24 of the fourth pass catalytic chamber 8. After gas passes through the fourth pass bed 24 gas collects in plenum 13 an exits the converter via converter outlet 42.

An advantage of the converter design is that the order of gas passage through the various chambers, plenums, and heat exchangers can easily be varied using different configurations of internal passages, external ducts and various inlet-outlet configurations.

It will be understood that in the second and third embodiments illustrated in FIGS. 7 and 8, that the configuration of the plenums 13, platforms 11 and the division plates 14 remain toroidal or annular and that gas flows freely about the annular spaces bounded vertically by the exterior shell 1 and the interior shell 28.

Although the above description relates to a specific preferred embodiment as presently contemplated by the inventor, it will be understood that the invention in its broad aspect includes mechanical and functional equivalents of the elements described herein.

I claim:

1. A converter comprising:
    an exterior shell having a central axis, at least one gas inlet and at least one gas outlet, the exterior shell including a base and an interior support structure;
    a plurality of vertically stacked catalytic chambers within the exterior shell and in communication with at least one gas inlet and at least one gas outlet, each chamber defined by an inner wall of the exterior shell, a permeable catalytic bed support platform, a lower division plate spaced below the platform defining a gas retention plenum and an upper division plate above the platform;
    wherein at least one of: said platform; said upper division plate; and said lower division plate having: a toroid surface symmetric about the central axis; an outer periphery supported by the inner wall of the exterior shell; and an inner periphery supported by the interior support structure,
    wherein the upper division plate and the lower division plate of each chamber in operation resist a pressure differential between a higher operational pressure and a lower operational pressure, and wherein the upper division plate and the lower division plate of each chamber is concave toward the higher operational pressure and convex toward the lower operational pressure.

2. A converter according to claim 1 comprising an upper and a lower pair of vertically stacked catalytic chambers wherein an intermediate division plate comprises the upper division plate of the lower chamber and the lower division plate of the upper chamber.

3. A converter according to claim 1 wherein the toroid surface comprises a plurality of identical segments, each segment having abutting radial edges with adjacent like segments.

4. A converter according to claim 1 wherein at least one said permeable catalytic bed support platform includes a central dish supported about an outer periphery by the interior support structure.

5. A converter according to claim 1 wherein at least one said upper division plate includes a central dome supported about an outer periphery by the interior support structure.

6. A converter according to claim 1 wherein the exterior shell includes a plurality of ring beams connecting the exterior shell to the outer periphery of the platforms and division plates.

7. A converter according to claim 1 wherein the interior support structure includes a plurality of ring beams connecting the interior support structure to the inner periphery of the toroid surface of the platforms and division plates.

8. A converter according to claim 4 wherein the interior support structure includes a plurality of ring beams connecting the interior support structure to the outer periphery of said platform dish.

9. A converter according to claim 5 wherein the interior support structure includes a plurality of ring beams connecting the interior support structure to the outer periphery of said division plate dome.

10. A converter according to claim 1 wherein the interior support structure comprises a plurality of columns defining gas flow passages between adjacent columns.

11. A converter comprising:
    an exterior shell having a central axis, at least one gas inlet and at least one gas outlet, the exterior shell including a base and an interior support structure;
    a plurality of vertically stacked catalytic chambers within the exterior shell and in communication with at least one gas inlet and at least one gas outlet, each chamber defined by an inner wall of the exterior shell, a permeable catalytic bed support platform, a lower division plate spaced below the platform defining a gas retention plenum and an upper division plate above the platform;
    wherein at least one of: said platform; said upper division plate; and said lower division plate having: a toroid surface symmetric about the central axis; an outer periphery supported by the inner wall of the exterior shell; and an inner periphery supported by the interior support structure,
    wherein the upper division plate and the lower division plate of each chamber in operation resist a pressure differential between a higher operational pressure and a lower operational pressure, and wherein the upper division plate and the lower division plate of each chamber is concave toward the higher operational pressure and convex toward the lower operational pressure, wherein the interior support structure comprises an interior shell,
    wherein the interior shell houses a primary gas heat exchanger having a first flow path with a first inlet and a first outlet, in thermal communication with a second flow path with a second inlet and a second outlet, wherein the first outlet outputs gas above the catalytic bed and the second inlet intakes gas from the plenum of the same one of said catalytic chambers,
    wherein the interior shell houses a secondary gas heat exchanger having a third flow path with a third inlet and a third outlet, in thermal communication with a fourth flow path with a fourth inlet and a fourth outlet, wherein:

the third outlet outputs gas above the catalytic bed of a third pass catalytic chamber; and the fourth outlet outputs gas above the catalytic bed of a fourth pass catalytic chamber.

12. A converter according to claim 11 comprising a first pass catalytic chamber and a second pass catalytic chamber, wherein:

the first outlet and the second inlet communicate with the first pass catalytic chamber; and the second outlet outputs gas above the catalytic bed of the second pass catalytic chamber.

13. A converter according to claim 11 wherein:

the second pass catalytic chamber communicates with the third pass catalytic chamber via a duct external to the exterior shell and through the secondary heat exchanger.

14. A converter according to claim 11 wherein the interior shell includes gas flow openings in communication with at least one of: said plenum; said chamber above the catalytic bed; said heat exchanger inlet; and said heat exchanger outlet.

15. A converter according to claim 14 wherein the gas flow openings in the interior shell are distributed circumferentially in a horizontal plane in communication with one of said catalytic chambers.

* * * * *

(12) EX PARTE REEXAMINATION CERTIFICATE (9253rd)
United States Patent
Tabak

(10) Number: US 7,497,998 C1
(45) Certificate Issued: Aug. 28, 2012

(54) GAS CONVERTER

(75) Inventor: Enrique Tabak, Toronto (CA)

(73) Assignee: SNC-Lavalin Inc., Toronto, Ontario (CA)

Reexamination Request:
No. 90/011,723, Jun. 1, 2011

Reexamination Certificate for:
Patent No.: 7,497,998
Issued: Mar. 3, 2009
Appl. No.: 11/515,776
Filed: Sep. 6, 2006

(51) Int. Cl.
*B01D 50/00* (2006.01)
*B01J 10/00* (2006.01)
*B01J 8/02* (2006.01)
*C01B 17/74* (2006.01)
*F01N 3/10* (2006.01)

(52) U.S. Cl. ............... 422/171; 422/173; 422/176; 422/180; 422/181; 422/211; 422/532; 422/533; 422/637

(58) Field of Classification Search .................. None
See application file for complete search history.

(56) References Cited

To view the complete listing of prior art documents cited during the proceeding for Reexamination Control Number 90/011,723, please refer to the USPTO's public Patent Application Information Retrieval (PAIR) system under the Display References tab.

*Primary Examiner* — Timothy J Kugel

(57) ABSTRACT

A converter having an exterior shell with a central axis, at least one gas inlet and at least one gas outlet. The exterior shell includes a base and an interior support structure. A number of vertically stacked catalytic chambers within the exterior shell are each in communication with one or more gas inlets and gas outlets. Each chamber is defined by an inner wall of the external shell, a permeable catalytic bed support platform, a lower division plate spaced below the platform defining a gas retention plenum and an upper division plate above the platform. At least one of: the platform; the upper division plate; and the lower division plate have a toroid surface symmetric about the central axis with an outer periphery supported by the inner wall of the exterior shell and an inner periphery supported by the interior support structure.

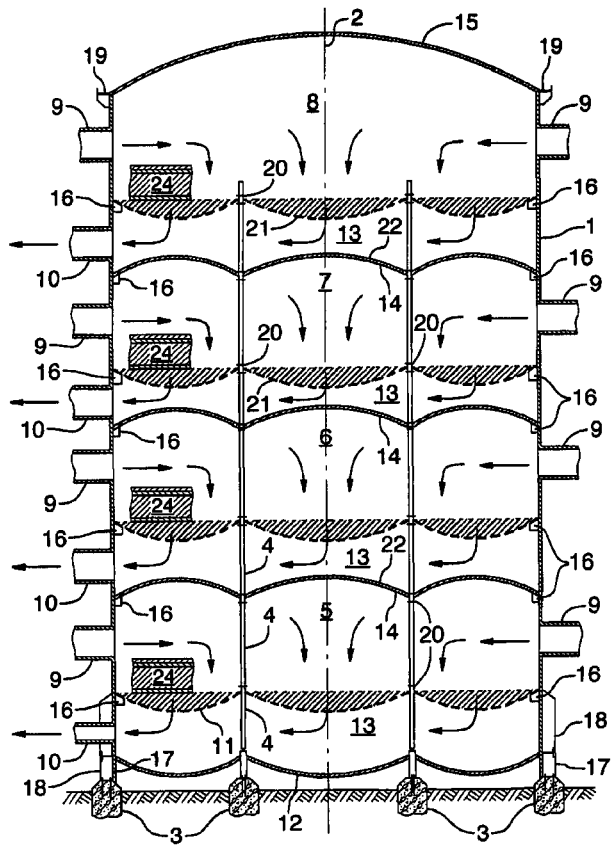

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1 and 10 are determined to be patentable as amended.

Claims 2-5 and 7-9, dependent on an amended claim, are determined to be patentable.

Claims 11-15 were not reexamined.

1. A converter comprising:
   an exterior shell having a central axis, at least one gas inlet and at least one gas outlet; the exterior shell including a base and an interior support structure;
   a plurality of vertically stacked catalytic chambers within the exterior shell and in communication with at least one gas inlet and at least one gas outlet, each chamber defined by an inner wall of the exterior shell, a permeable catalytic bed support platform, a lower division plate spaced below the platform defining a gas retention plenum and an upper division plate above the platform;
   wherein at least one of: said platform; said upper division plate; and said lower division plate having: a toroid surface symmetric about the central axis; an outer periphery supported by the inner wall of the exterior shell; and an inner periphery supported by the interior support structure, *wherein the exterior shell includes a plurality of ring beams, each ring beam connecting the exterior shell to the outer periphery of the toroid surface of at least one of: the platforms, and the division plates,*
   wherein the upper division plate and the lower division plate of each chamber in operation resist a pressure differential between a higher operational pressure and a lower operational pressure, and wherein the upper division plate and the lower division plate of each chamber is concave toward the higher operational pressure and convex toward the lower operational pressure.

10. A converter according to claim 1 wherein the interior support structure comprises a plurality of *vertical* columns *disposed in a circumferentially spaced apart array at a radial distance from the central axis of the converter* defining *horizontal* gas flow passages between adjacent columns.

\* \* \* \* \*

(12) EX PARTE REEXAMINATION CERTIFICATE (10540th)
United States Patent
Tabak

(10) Number: US 7,497,998 C2
(45) Certificate Issued: Mar. 16, 2015

(54) GAS CONVERTER

(75) Inventor: Enrique Tabak, Toronto (CA)

(73) Assignee: SNC-Lavalin Inc., Toronto, Ontario (CA)

Reexamination Request:
No. 90/013,202, Apr. 8, 2014

Reexamination Certificate for:
Patent No.: 7,497,998
Issued: Mar. 3, 2009
Appl. No.: 11/515,776
Filed: Sep. 6, 2006

Reexamination Certificate C1 7,497,998 issued Aug. 28, 2012

(51) Int. Cl.
| | |
|---|---|
| *B01D 50/00* | (2006.01) |
| *B01J 8/02* | (2006.01) |
| *B01J 10/00* | (2006.01) |
| *C01B 17/74* | (2006.01) |
| *F01N 3/10* | (2006.01) |
| *B01J 19/24* | (2006.01) |
| *C01B 17/80* | (2006.01) |

(52) U.S. Cl.
CPC .............. *B01J 8/0242* (2013.01); *B01J 19/248* (2013.01); *B01J 19/249* (2013.01); *C01B 17/803* (2013.01); *B01J 2208/00194* (2013.01); *B01J 2208/00814* (2013.01); *B01J 2208/00884* (2013.01); *B01J 2208/021* (2013.01); *B01J 2208/022* (2013.01); *B01J 2219/246* (2013.01); *B01J 2219/2459* (2013.01); *B01J 2219/2453* (2013.01); *B01J 2219/2481* (2013.01)
USPC ........... 422/171; 422/173; 422/176; 422/180; 422/181; 422/211; 422/637; 423/532; 423/533

(58) Field of Classification Search
None
See application file for complete search history.

(56) References Cited

To view the complete listing of prior art documents cited during the proceeding for Reexamination Control Number 90/013,202, please refer to the USPTO's public Patent Application Information Retrieval (PAIR) system under the Display References tab.

*Primary Examiner* — Sean E Vincent

(57) ABSTRACT

A converter having an exterior shell with a central axis, at least one gas inlet and at least one gas outlet. The exterior shell includes a base and an interior support structure. A number of vertically stacked catalytic chambers within the exterior shell are each in communication with one or more gas inlets and gas outlets. Each chamber is defined by an inner wall of the external shell, a permeable catalytic bed support platform, a lower division plate spaced below the platform defining a gas retention plenum and an upper division plate above the platform. At least one of: the platform; the upper division plate; and the lower division plate have a toroid surface symmetric about the central axis with an outer periphery supported by the inner wall of the exterior shell and an inner periphery supported by the interior support structure.

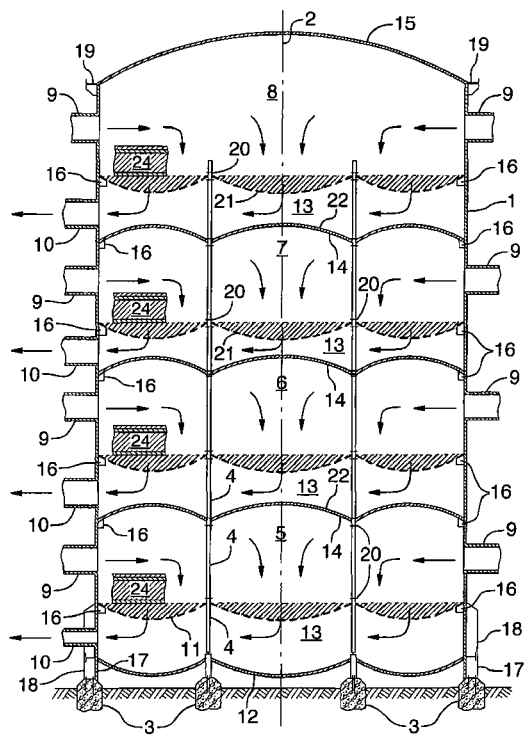

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 6 was previously cancelled.

Claims 1-5 and 7-15 are cancelled.

\* \* \* \* \*